United States Patent [19]
Asano et al.

[11] Patent Number: 5,799,115
[45] Date of Patent: Aug. 25, 1998

[54] IMAGE FILING APPARATUS AND METHOD

[75] Inventors: Mieko Asano; Hiroaki Kubota; Shigeyoshi Shimotsuji, all of Kanagawa-ken, Japan

[73] Assignee: Kabushiki Kaisha Toshiba, Kanagawa, Japan

[21] Appl. No.: 612,801

[22] Filed: Mar. 11, 1996

[30] Foreign Application Priority Data

Mar. 16, 1995 [JP] Japan ................... 7-057633

[51] Int. Cl.[6] .................................. G06K 9/54
[52] U.S. Cl. ............... 382/305; 382/190; 382/194; 707/507; 707/509; 395/768; 395/784; 358/403
[58] Field of Search ................... 382/305, 190, 382/194; 364/406; 370/300, 436, 400, 516; 707/507, 509; 395/117, 768, 784; 358/403

[56] References Cited

U.S. PATENT DOCUMENTS 5,179,649  1/1993  Masuzaki et al. ............ 707/507
5,504,676  4/1996  Domen et al. ............... 364/406

FOREIGN PATENT DOCUMENTS 61-75477  4/1986  Japan .............. G06F 15/62

*Primary Examiner*—Jose L. Couso
*Assistant Examiner*—Anh Hong Do
*Attorney, Agent, or Firm*—Graham & James LLP

[57] ABSTRACT

In an image filing apparatus, the registered format similar to an input format is correctly retrieved from a plurality of the registered formats in a format registration section. The image data of a new form is inputted through an image input section. A format registration section previously registers a plurality of formats of forms. A format discrimination section extracts the input format from the new form, compares the input format with the plurality of formats in the format registration section, and calculates similarities between the input format and the plurality of formats, respectively. A preservation section stores the image data of the new form by using the registered format selected from the plurality of formats in accordance with the similarity.

17 Claims, 22 Drawing Sheets

| | (x 0, y 0) |
|---|---|
| COORDINATE VALUE | (x 1, y 1) |
| | (x 2, y 2) |
| | (x 3, y 3) |
| LINE – WIDTH | 5 |
| | 5 |
| | 5 |
| | 5 |
| KIND OF LINE<br>(1: SOLID LINE<br>2: DOTTED LINE) | 1 |
| | 1 |
| | 1 |
| | 1 |
| CORNER INFORMATION<br>(1: CURVE<br>2: RIGHT ANGLE) | 1 |
| | 1 |
| | 1 |
| | 1 |

ADDITION FRAME

ADDITION FRAME

MERGE FRAME

MERGE FRAME

| MONTH | DAY | NAME |
|-------|-----|------|
| 9 | 2 | JOHN |
| 9 | 3 | JIM |
| 9 | 7 | TOM |
| 9 | 8 | MIKE |

| MONTH | DAY | NAME |
|-------|-----|------|
| 9 | 2 | JOHN |
| 9 | 3 | JIM |
| 9 | 7 | TOM |
| 9 | 8 | MIKE |

CORRESPONDING FRAME

INPUT FORM

NUMBER OF FRAMES 6

NUMBER OF CORRESPONDING FRAMES 6

6/6 * 100=100(%)

NUMBER OF FRAMES 12

NUMBER OF CORRESPONDING FRAMES 2

2/12 * 100=17(%)

NUMBER OF FRAMES 8

NUMBER OF CORRESPONDING FRAMES 4

4/8*100=50(%)

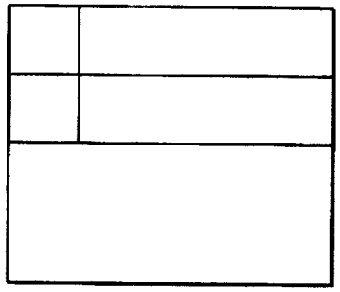
INPUT FORM
FIG. 19(a)
1st ORDER    2nd ORDER    3rd ORDER
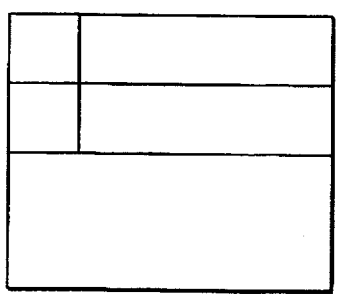 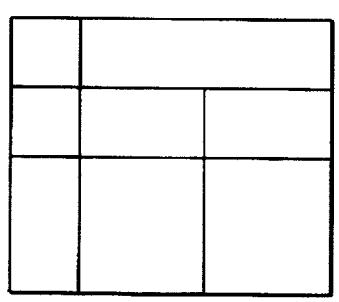 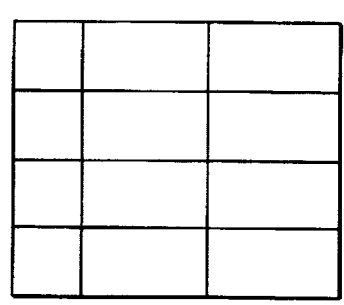
SIMILARITY 100(%)   SIMILARITY 50(%)   SIMILARITY 17(%)
FIG. 19(b)    FIG. 19(c)    FIG. 19(d)

SIMILARITY
0/10*100=0(%)

SIMILARITY
0/8*100=0(%)

SIMILARITY
4/7*100=57(%)

SIMILARITY
4/13*100=30.7(%)

SIMILARITY
4/10*100=40(%)

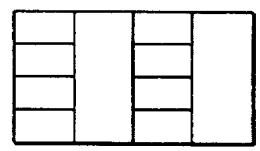
FIG. 23(a)
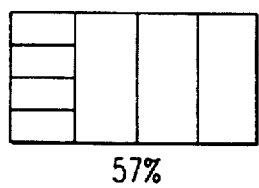 > 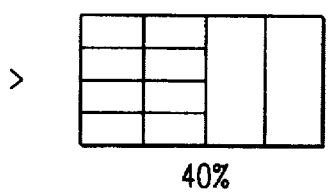 > 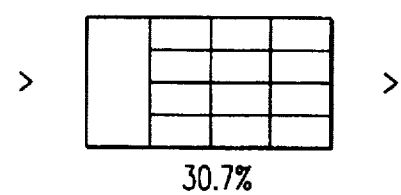 >
57%  40%  30.7%
FIG. 23(d)   FIG. 23(f)   FIG. 23(e)
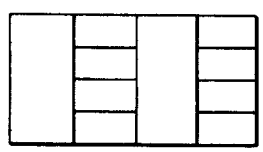 = 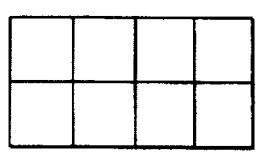 >
FIG. 23(b)   FIG. 23(c)

| | |
|---|---|
| ▲ FORM 1 | ▲ 1 |
| ■ FORM 2 | ■ 1 |
| ● FORM 3 | ● 1 |
| × FORM 4 | △ 2 |
| △ FORM 5 | □ 23 |
| □ FORM 6 | ○ 1 |
| ○ FORM 7 | |

▨ CONSTANT QUANTITY AREA OF FRAMES OF NEW FORM

| NAME OF THE SAMPLE FORM | NUMBER OF VOTE | SIMILARITY VALUE |
|---|---|---|
| FORM 1 | 1 | 1/27 x 100 = 3.7 |
| FORM 2 | 1 | 1/27 x 100 = 3.7 |
| FORM 3 | 1 | 1/27 x 100 = 3.7 |
| FORM 4 | 0 | 0 |
| FORM 5 | 2 | 2/27 x 100 = 7.4 |
| FORM 6 | 23 | 23/27 x 100 = 85.1 |
| FORM 7 | 1 | 1/27 x 100 = 3.7 |

FIG. 27

IMAGE FILING APPARATUS AND METHOD

BACKGROUND OF THE INVENTION

1. Field of the Invention

The present invention relates to an image filing apparatus and method for correctly retrieving a registered format similar to an input format from a plurality of registered formats stored in a format registration section.

2. Description of the Related Art

In an image filing method of the prior art, a format registration section previously stores image (form) data with a retrieval keyword. A user inputs the keyword to retrieve his desired image data through the keyboard. However, in this method, it is not assured that the user's input keyword is the same as the retrieval keyword added to his desired image. Moreover, it often happens that the user inputs an incorrect keyword which does not represent a content of his desired image data.

In a method for generating a keyword automatically, the method includes recognizing character code in document data and extracting the keyword by using the character code. However in this method, it is difficult to decide from which part in the document the keyword should be derived.

As another method for generating a keyword, the user marks a keyword area in the document by a specified color and the character in the specified colored area is recognized to be the retrieval key. However, in this method, it also happens that the user mistakenly marks a keyword which does not represent a content of the document.

In short, as a method for correctly retrieving a user's desired data, it is necessary that the keyword or identifier representing the content of the data is automatically added to the data.

In this respect, Japanese Patent Disclosure (Kokai) No. 61-75477 discloses that characteristic patterns (image) of plural sample forms are previously stored. Then, a characteristic pattern of a new form to be newly registered is extracted, and the characteristic pattern of the new form is compared with the characteristic patterns of the plural sample forms. If the characteristic pattern of the new form is matched with one of the characteristic patterns of the plural sample forms, a classification code of the one sample form is added to the new form. However, in this prior art, an integration value of horizontal lines and vertical lines (add value of number of pixels of the line) of the image is used for extracting the characteristic pattern. FIG. 1 is a schematic diagram of processing for deciding a similarity according to the line information of the form. In this case, the format A shown in FIG. 1 (a) is different from the format B shown in FIG. 1 (b). However, the integration value of horizontal lines and vertical lines of the format A is same as the integration value of horizontal lines and vertical lines of the format B. The reason is that both the format A and the format B include same configuration of horizontal lines and vertical lines. Accordingly, even if the format A is different from the format B, the format A is incorrectly decided to be same as the format B according to the prior art.

Furthermore, in the case that a registered format similar to the new format is not found, plural sample formats previously stored are displayed in order and the user selects one format similar to a format of the new form. However, if various kinds of the plural sample formats are stored in the format registration section, it takes a significant amount of time for the user to select one format from the plural sample formats.

SUMMARY OF THE INVENTION

It is an object of the present invention to provide an image filing apparatus and method for correctly retrieving a registered format similar to an input format from a plurality of the registered formats.

According to the present invention, there is provided image filing apparatus, comprising: image input means for inputting image data of a new form; format registration means for previously registering a plurality of formats of forms; format discrimination means for extracting an input format from the new form inputted through said image input means, for comparing the input format with the plurality of registered formats in said format registration means, and for calculating similarities between the input format and the plurality of registered formats, respectively; and preservation means for storing the image data of the new form by using a one of the registered formats selected from the plurality of formats in accordance with the similarity.

Further in accordance with the present invention, there is provided an image filing method comprising the steps of; inputting image data of a new form; registering a plurality of formats of forms; extracting an input format from the new form; comparing the input format with the plurality of registered formats; calculating similarities between the input format and the plurality of registered formats; and storing the image data of the new form by using a one of the registered formats selected from the plurality of formats in accordance with the similarity.

BRIEF DESCRIPTION OF THE DRAWINGS

FIGS. 4(a)–4(d) are schematic diagrams of an example of extracted character lines.

FIGS. 15(a)–15(e) are schematic diagrams of an example of merged frames in the format.

FIGS. 16(a)–16(d) are schematic diagrams of an example of an extracted circumscribed rectangle in the form.

FIGS. 19(a)–19(d) are schematic diagrams of an example of similarity values of three registered formats for the input format.

FIGS. 23(a)–23(f) are schematic diagrams of an example of outputting the sample format according to order of similarity.

FIG. 27 is a schematic diagram of an example of similarity values and a number of votes of each sample form.

DETAILED DESCRIPTION OF THE PREFERRED EMBODIMENTS

Figure 1A:
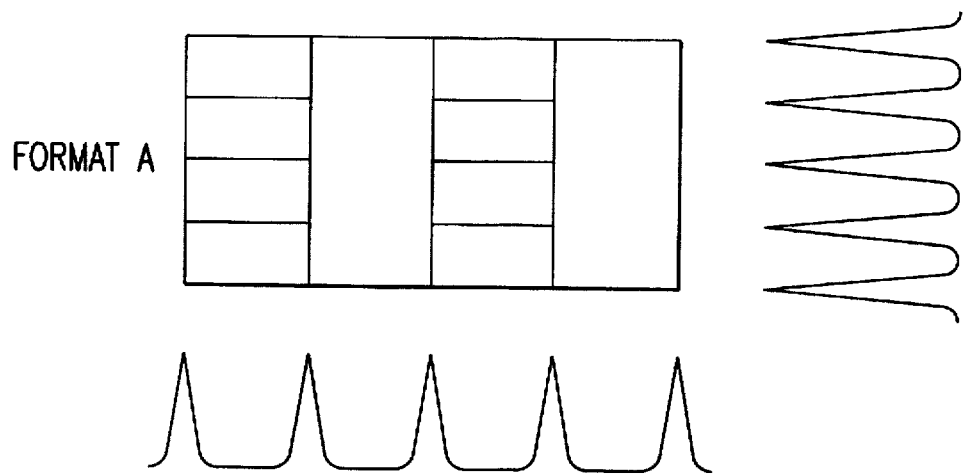
FIGS. 1(a) and 1(b) are schematic diagrams of a process of deciding similarity by using line information of the form according to the prior art.
Figure 1B:
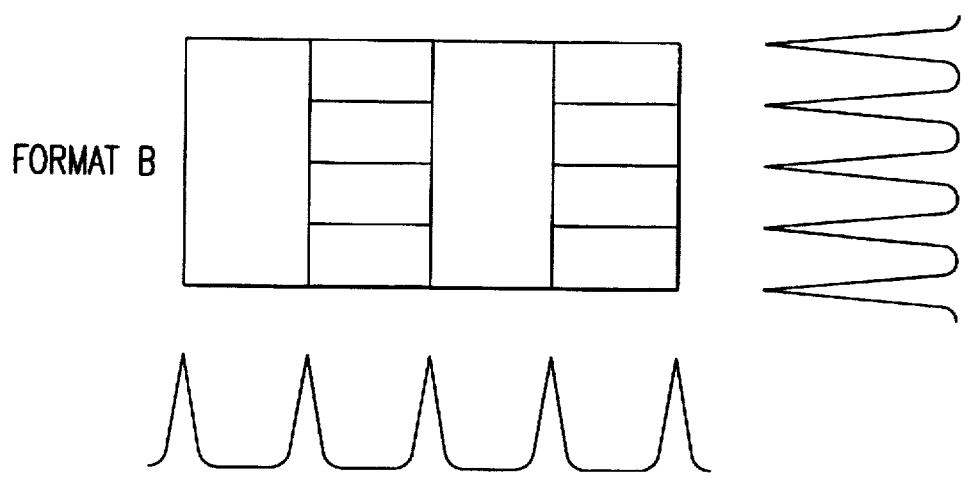
Figure 2:
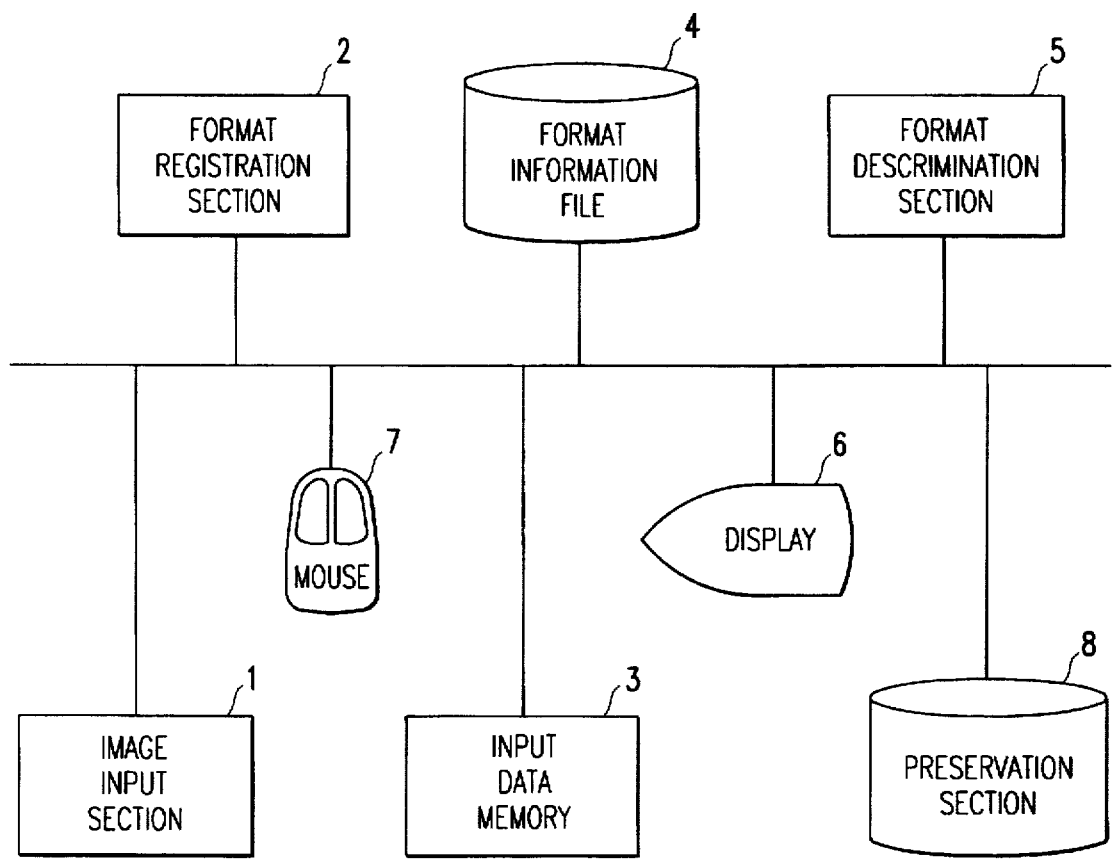
FIG. 2 is a schematic diagram of image filing apparatus according to the present invention.

An embodiment of the present invention will be explained in detail with reference to the figures. FIG. 2 is a schematic diagram of an image filing apparatus according to the present invention. Two kinds of modes, i.e., a format registration mode and a format discrimination mode, are prepared in the image filing apparatus. First, the processing in the format registration mode will be explained. In FIG. 2, an image input section 1 scans a plurality of forms that are to be sample format, and the image signals of the plurality forms are supplied to a format registration section 2. An input data memory 3 stores the image signals of the plurality of forms. The format registration section 2 extracts lines, characters, and frames from the images of the plurality of forms and defines formats by using the frames. Then, the defined format is outputted to the user through a display 6. The user confirms and corrects the format on the display 6 if necessary. In this way, the format information of the plurality of forms is stored in a format information file 4 as sample formats.

Next, the processing in the format discrimination mode will be explained. The image input section 1 scans a new form to be newly preserved, and the image signal of the new form is supplied to a format discrimination section 5. The format discrimination section 5 decides which sample format is similar to a format of the new form by referring to the plurality of sample formats stored in the format information file 4. Then, the decision result is outputted for the user to confirm through the display 6. In this way, the image data of the new form is stored in a preservation section 8 by using the decision result, i.e., in accordance with the sample format similar to the new form.

Figure 3:
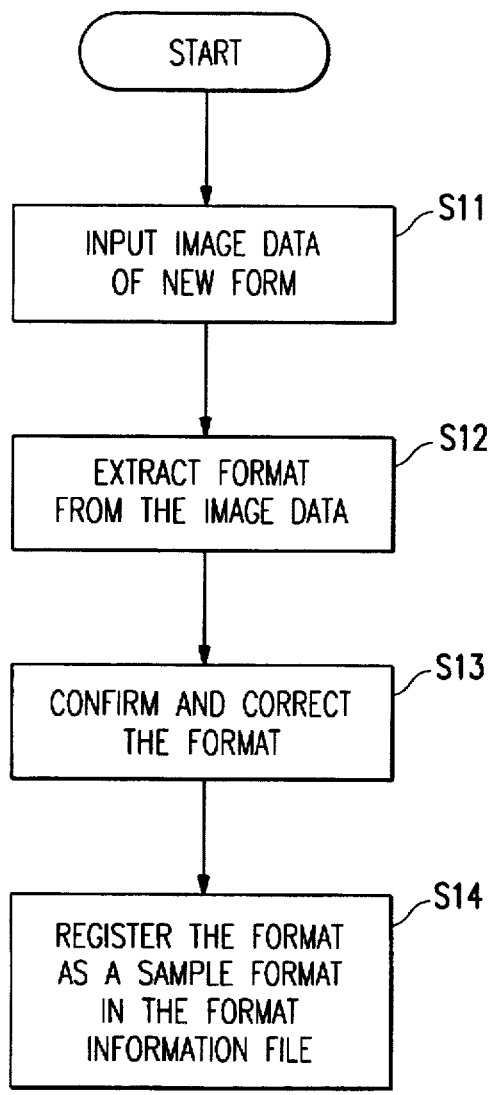
FIG. 3 is a flow chart of processing of a format registration mode according to the present invention.
Figures 4A, 4B, 4C, 4D:
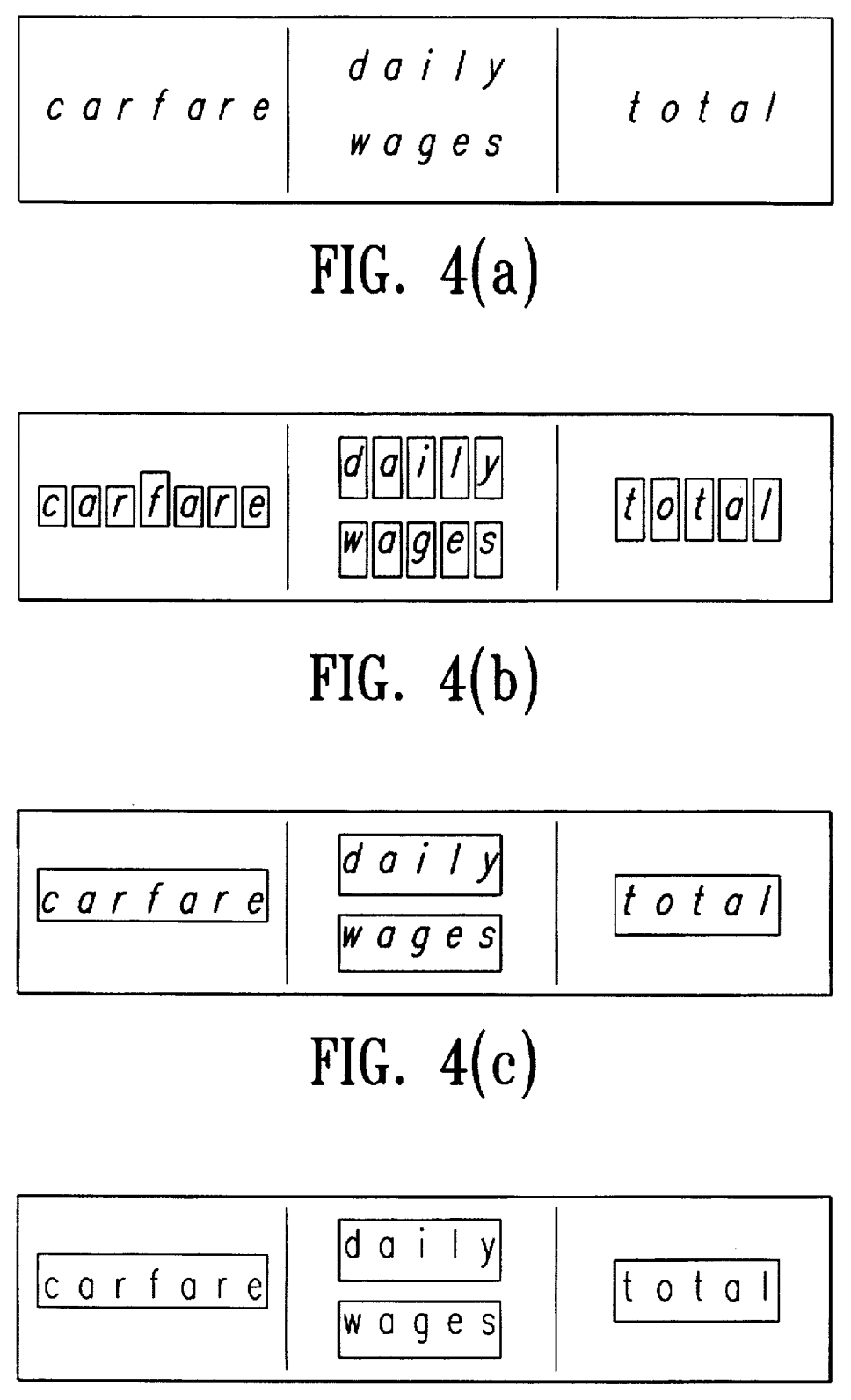

FIG. 3 is a flow chart of processing of the format registration mode of the present invention. First, image data of the new form is inputted and displayed on the display (S11). Then, characters, character-lines and frames are extracted from the image data (S12). With respect to this step, the characters are extracted by the following method. FIG. 4(a) shows original image data which the user inputs including handwritten characters. First, concatenated area of a block of pixels is extracted as one character area and a circumscribed square of the one character area is extracted. FIG. 4(b) shows the circumscribed square of each character area in the image data. Then, if two neighboring circumscribed squares are located near each other (within a threshold value) in the image, the two neighboring circumscribed squares are merged. In case of such merging, a circumscribed rectangle of the two merged squares is calculated. If a change value of the circumscribed rectangle along the vertical direction is below a threshold value, two characters of the two merged squares are decided to be included in the same character line. FIG. 4(c) shows the character lines extracted by merging the neighboring plural characters. Then, each character in the character line is recognized. The image data of each character is replaced by corresponding character code. FIG. 4(d) shows the character code in each character line. In short, FIG. 4(c) shows image data of each character, but FIG. 4(d) shows the character code pattern of each character according to the recognition result.

Figure 5:
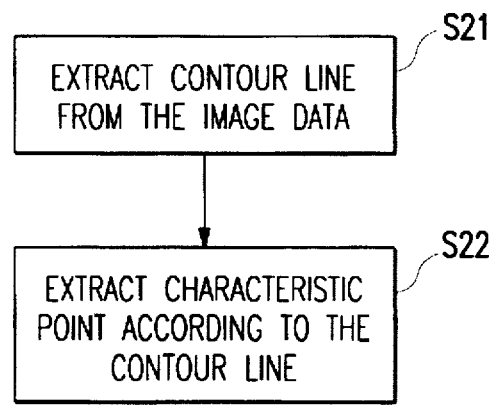
FIG. 5 is a flow chart of processing for extracting characteristic points according to the present invention.
Figures 6A, 6B:
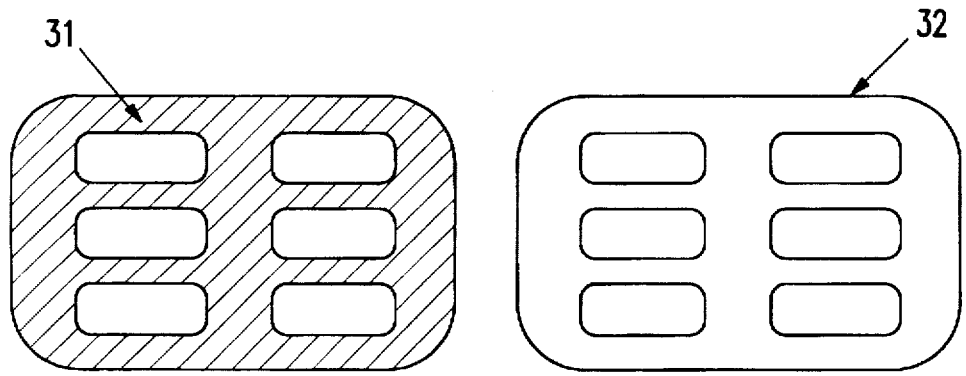
FIGS. 6(a) and 6(b) are schematic diagrams of an example of extracted contour line.
Figure 7:
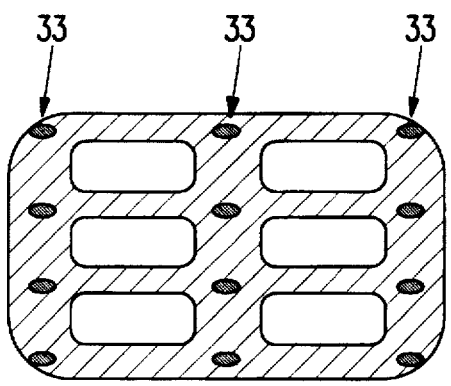
FIG. 7 is a schematic diagram of an example of extracted characteristic points.

FIG. 5 shows a flow chart of processing for extracting a frame. First, the image of the input form is scanned and a trace-start point and contour line are extracted from the image (S21). For example, the trace-start point is identified as a point in the upper left portion of the image. From the trace-start point, a closed curved line as a boundary line is traced along a line in the image in a clockwise direction. The boundary line information is stored as a series of coordinate values, or a series of direction codes. Then, characteristic points, i.e., a cross point and a corner point, are extracted from the boundary line (S22). For example, a series of ⌐ points (defined as an inside curve or corner) are detected from the boundary line and a series of ⌐ points (defined as an outside curve or corner) corresponding to the series of ⌐ points are detected. With respect to extracting characteristic points, a curve ratio of each characteristic point is compared with thresholds K0, K1. If the curve ratio is below K0, the characteristic point is a ⌐ point. If the curve ratio is above K1, the characteristic point is a ⌐ point. FIG. 6(a) shows an example of an original image 31, and FIG. 6(b) shows a boundary line 32 in the image. FIG. 7 shows characteristic points 33 in the image.

Figures 8, 9:
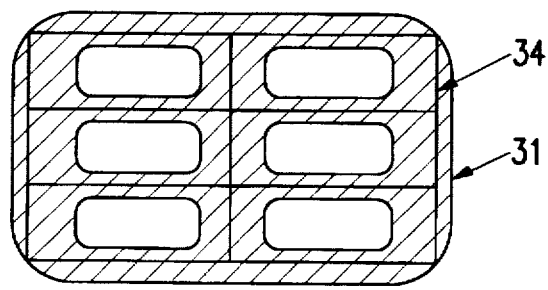
FIG. 8 is a schematic diagram of a data structure of a frame in a form.
FIG. 9 is a schematic diagram of an example of an extracted frame in a form.

Next, a frame in the image is extracted by referring to a combination of the characteristic points. For example, it is decided whether a figure consisting of four characteristic points is a rectangle or a parallelogram, or not. If the figure is decided to be a rectangle or the a parallelogram, the four characteristic points are decided to define the frame. FIG. 8 shows data structure information defining a frame. As the frame information, four coordinate values, line-width, kind of line and corner information are stored by unit of frame.

Figure 10:
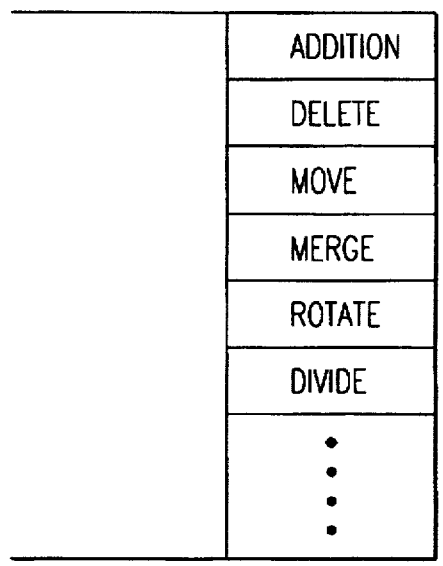
FIG. 10 is a schematic diagram of an example of a menu for confirmation and correction.
Figure 11A:
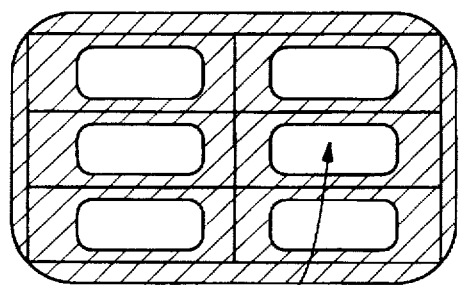
FIGS. 11(a) and 11(b) are schematic diagrams of an example of an added frame in the format.
Figure 11B:
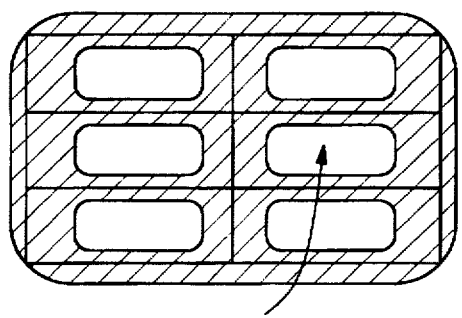
Figure 12A:
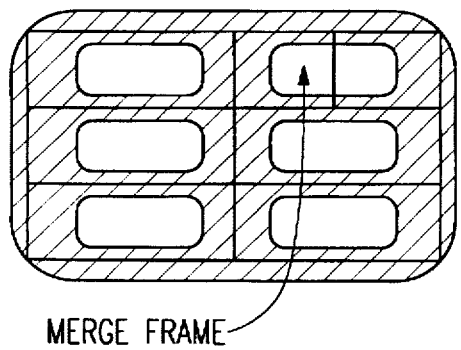
FIGS. 12(a) and 12(b) are schematic diagrams of an example of a merged frame in the format.
Figure 12B:
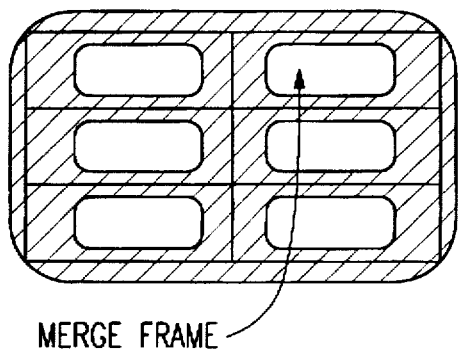

Returning to the flow chart in FIG. 3, the frame of the form is displayed for the user to confirm and correct (S13). With respect to this step, a method for correcting the frame will be explained. FIG. 9 shows plural frames 34 in the form 31. FIG. 10 shows a menu for correction on the display 6. The user selects the menu for correction and designates a part of the frame to be corrected on display 6 by using a mouse 7. FIG. 11 shows an example of adding one frame to the other frames in the form. In this case, the user selects "ADDITION" from the menu and designates four corner points of the one frame. FIG. 12 shows an example of one new frame formed by merging two frames. In this case, the user selects "MERGE" from the menu and designates the two frames to be merged. Finally, the format consisting of plural frames is registered in the format information file (S14). In this way, a plurality of sample formats to be referred to for processing a new form are stored.

Figure 13:
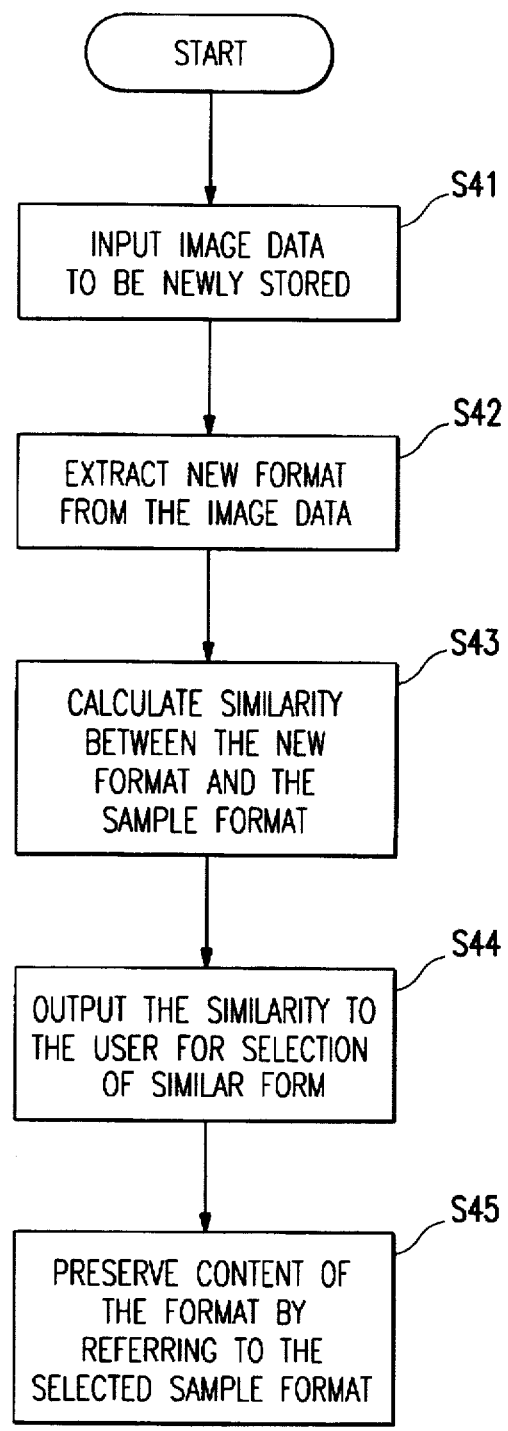
FIG. 13 is a flow chart of processing of a format descrimination mode according to the present invention.
Figure 14:
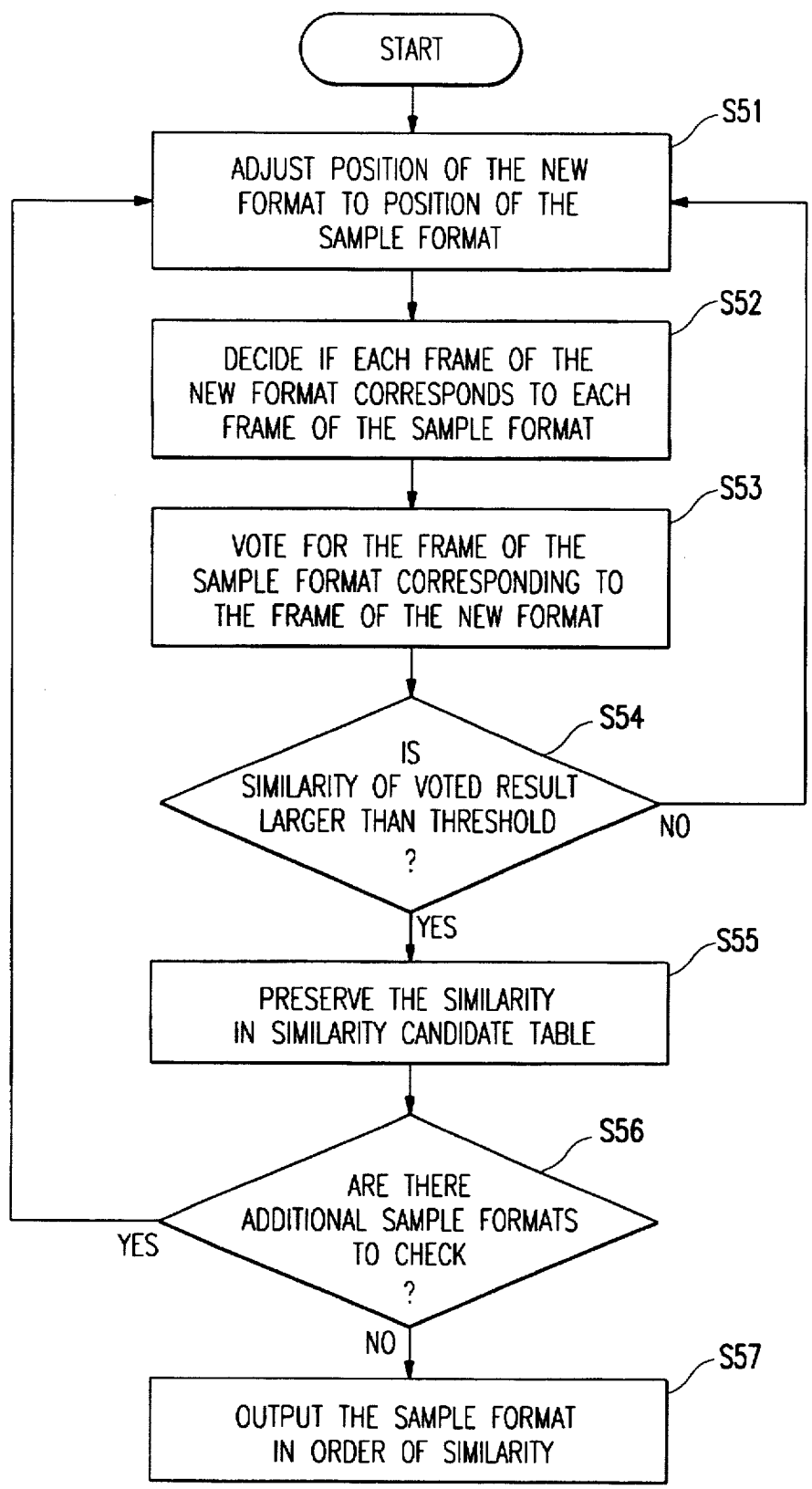
FIG. 14 is a flow chart of processing for calculating a similarity between the new format and the registered format according to the present invention.
Figures 15A, 15B, 15C, 15D, 15E:
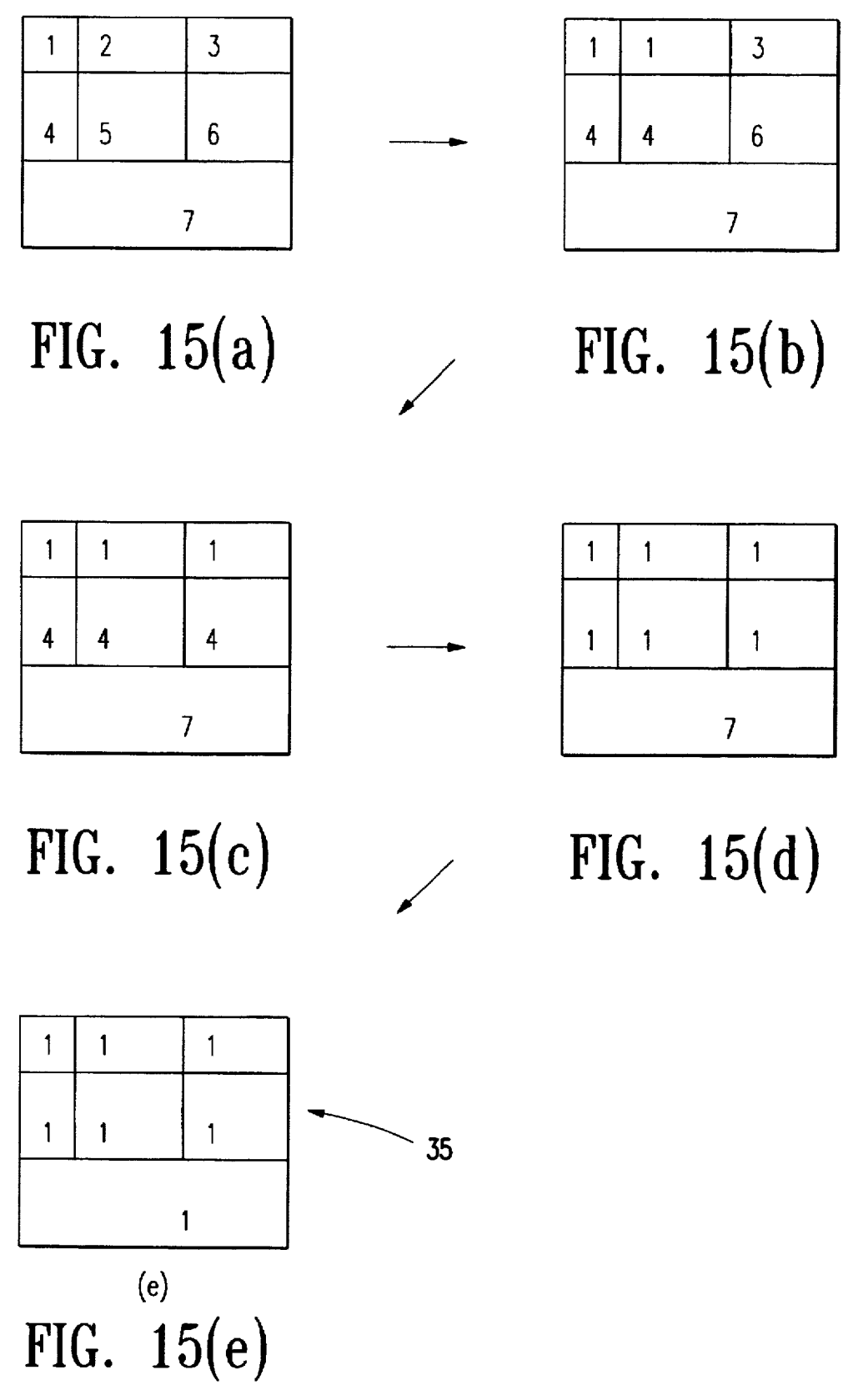

Next, the processing of the format discrimination mode will be explained. FIG. 13 is a flow chart of processing of the format discrimination mode. An image of a new form to be newly stored is inputted by scanning (S41). The lines, characters, and frames are extracted from the image in the same way as in the registration mode (S42). The format of the new form is defined by its frames, which is treated as a new format. A similarity between the new format and each sample format registered in the format information file is calculated (S43). FIG. 14 is a flow chart of processing for calculating the similarity. First, the position of the new format is adjusted to the position of the sample format (S51). For example, the circumscribed rectangle of the sample format is calculated. In this calculation, a maximum value and a minimum value of coordinates of characteristic points of all frames in the sample format is used. In the same way, the circumscribed rectangle of the new format is calculated. FIG. 15 is a schematic diagram of a method for determining the circumscribed rectangle by a sequence of operations. In this case, the neighboring frames are merged in order, and the circumscribed rectangle is finally determined if a frame to be merged is not in the format. FIG. 15(a) is a new format consisting of seven frames 1~ 7. First, the neighboring frames (1,2,3) (4,5,6) along the horizontal direction are merged in order as shown in FIGS. 15(b) and 15(c). The reason for such merging is that the coordinates of the characteristic points of the frames (1,2,3) (4,5,6) along the vertical direction are same. Thus, as shown in FIG. 15(c), the new format is divided into three frames 1,4,7. Next, the neighboring frames (1,4,7) along the vertical direction are merged in order as shown in FIGS. 15(d) and 15(e). The reason is that the coordinates of the characteristic points of the frames (1,4) (1,7) along the horizontal direction are the same. Finally, as shown in FIG. 15(e), the circumscribed rectangle 35 corresponding to the frame 1 is outputted.

FIG. 16 is a schematic diagram of a specific example of the circumscribed rectangle in a form. FIG. 16(a) is an example of the sample form, FIG. 16(b) is an example of the new form which includes character information and FIGS. 16(c) and 16(d) show the circumscribed rectangle 35 extracted from the sample form and the new form, respectively.

Figure 17A:
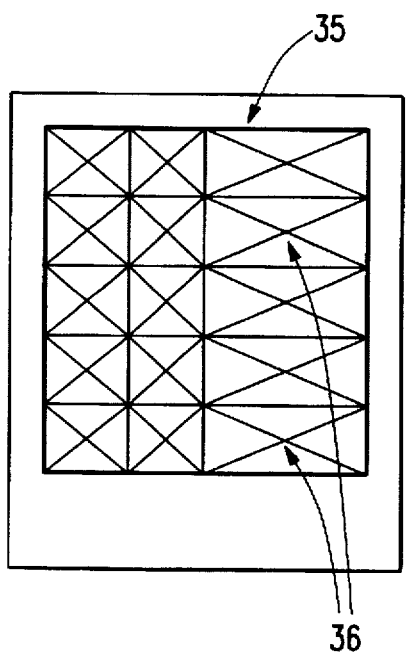
FIGS. 17(a) and 17(b) are schematic diagrams of an example of a center point in each frame of the format.
Figure 17B:
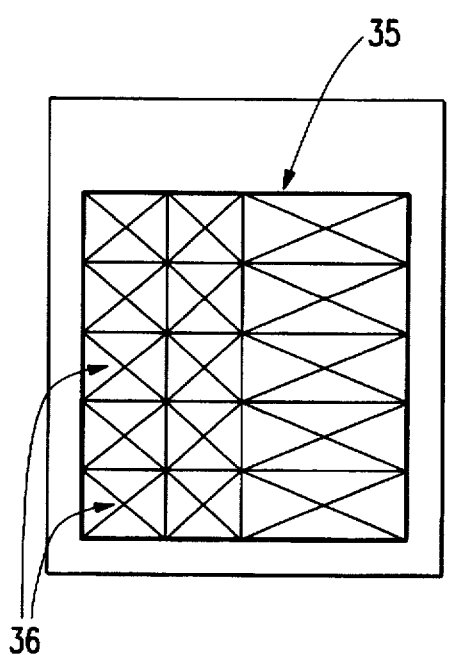

Next, a coordinate value of a center point of each frame is calculated. In this case, the coordinate value of the center point is calculated from the four coordinate values of the four corner points (characteristic points) for each frame. FIGS. 17(a) and 17(b) show the circumscribed rectangle 35 and the center point 36 of each frame. It is assumed that the difference between the coordinate value of the upper left corner point of the circumscribed rectangle of the sample form and the coordinate value of upper left corner point of the circumscribed rectangle of the new form is (dx, dy). The coordinate value of the center point of each frame of the new form is corrected by using (dx, dy). Then, it is decided whether or not each frame of the sample form respectively corresponds to each frame of the new form (S52). For example, it is assumed that the coordinate value of the center point of one of the frames of the sample form is (tcx, tcy) and coordinate value of corrected center point of the frame of the new form is (icx, icy). The distance D between the respective center points of the sample form and the new form is calculated as follows.

$$D=(icx-tcx)^2 +(icy-tcy)^2$$

If the distance D is below a threshold dth (D<dth), the frame of the sample form is decided to correspond to the frame of the new form. In this case, the frame of the sample form is allocated a vote of "1" (S53). After all frames of the sample form are checked, a similarity between the new form and each sample form is calculated as follows.

$$similarity = \frac{\text{number of frames of sample form corresponding to frames of new form (i.e., number of votes)}}{\text{number of all frames of sample form}}$$

Figure 18A:
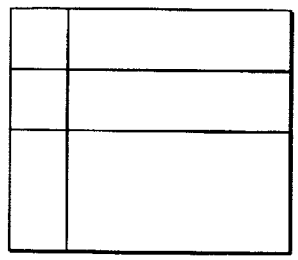
FIGS. 18(a)–18(d) are schematic diagrams of an example of a similarity-calculation between the input format and the registered format.
Figure 18A:
Figure 18B:
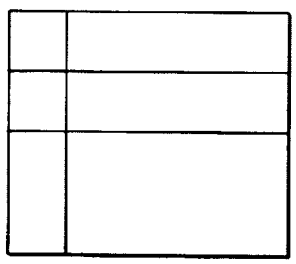
Figure 18B:
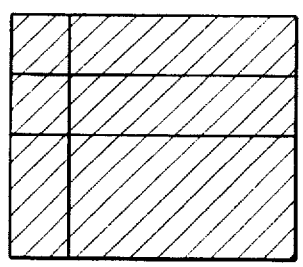
Figure 18C:
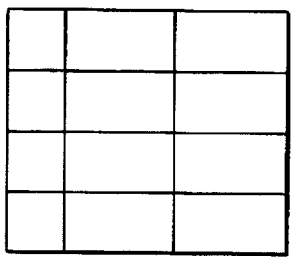
Figure 18C:
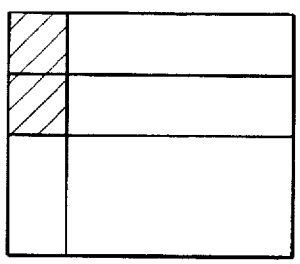
Figure 18D:
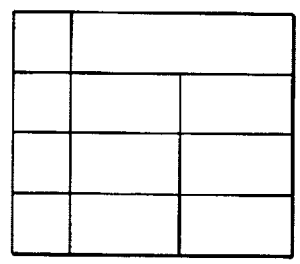
Figure 18D:
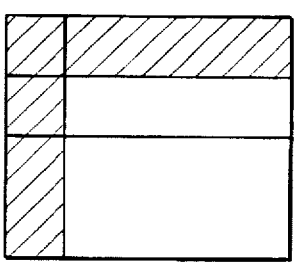

If the similarity is above a threshold Rth, the similarity and the identifier of the sample form are stored in a similarity candidate table (not shown) (S54,S55). In this way, the similarity of all sample forms is calculated and checked (S56). FIGS. 18(a)–18(d) show schematic diagrams of examples of similarity between the new form and plural sample forms. FIG. 18(a) is a format of the new form (input form). FIG. 18(b) is a format of a first sample form and the similarity (100%) between the first sample form and the new form. FIG. 18(c) is a format of a second sample form and the similarity (17%) between the second sample form and the new form. FIG. 18(d) is a format of a third sample form and the similarity (50%) between the third sample form and the new form.

Next, the sample formats whose similarities are stored in the similarity candidate table are displayed in order of similarity (S57). FIGS. 19(a)–19(d) are schematic diagrams of a method for displaying the sample forms in order of similarity, with the input form shown in FIG. 19(a). As shown in FIGS. 19(b)–19(d), the sample form corresponding to the highest similarity is displayed first, and the sample forms corresponding to the second and third highest similarities are displayed next. The user confirms and selects one sample form similar to the new form (S44 in FIG. 13). Lastly, the selected sample form is used for preserving the new form. For example, the content of the new form is extracted by referring to the selected sample form. Then, the content of the new form and the identifier of the selected sample form are stored in the preservation section 8 (S45 in FIG. 13).

Figure 20A:
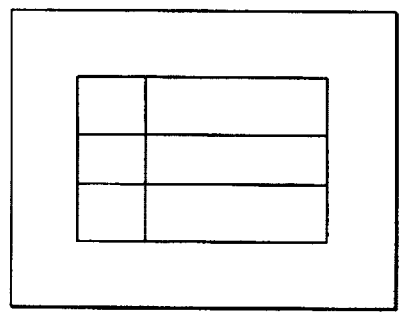
FIGS. 20(a)–20(c) are schematic diagrams of an example of an inclined format and a corrected format.
Figure 20B:
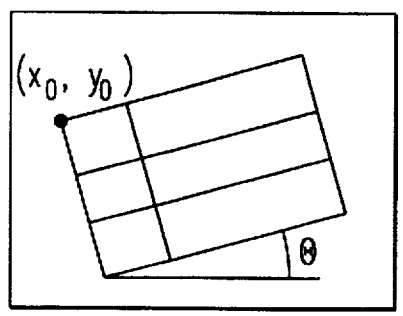
Figure 20C:
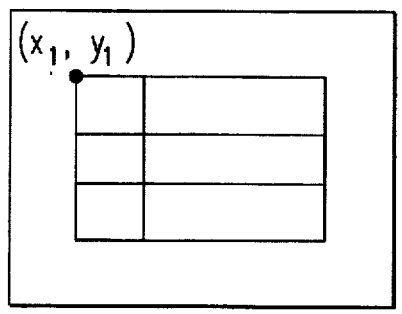
Figure 21:
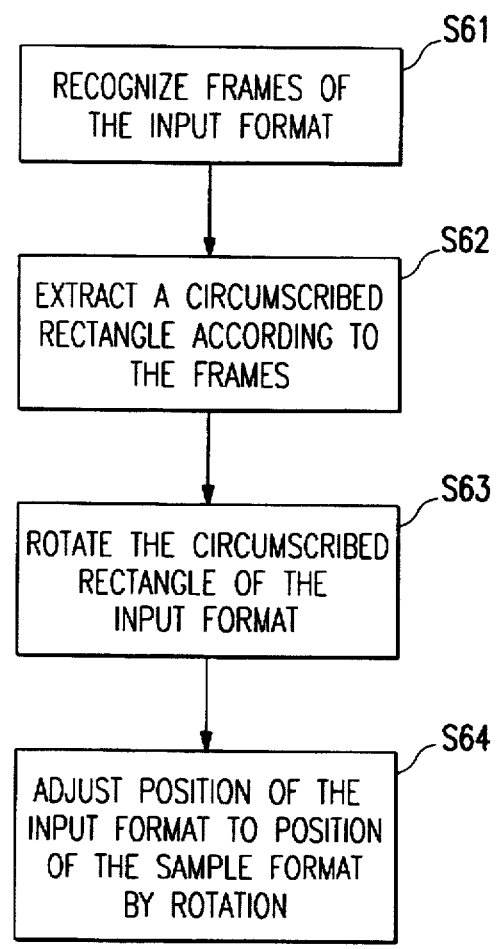
FIG. 21 is a flow chart of processing for adjusting a position of the inclined format according to the present invention.

FIGS. 20(a)–20(c) are schematic diagrams of an example of an inclined format and a corrected format. FIG. 21 is a flow chart of processing for adjusting a position of the inclined format according to the present invention. First, a plurality of frames in the input format is extracted (S61). Next, a circumscribed rectangle in the input format is extracted by merging the plurality of frames (S62). Then, a coordinate value of one corner point (upper left corner point) and inclined angle between the circumscribed rectangle and a horizontal axis are calculated. The input format (inclined format) is rotated by using the coordinate value of the corner point and the inclined angle so that the input format is located normally (S63). FIG. 20(a) is the position of the sample format, FIG. 20(b) is the position of the input format (inclined format) and FIG. 20(c) is the position of the input format located normally. It is assumed that the coordinate value of the corner point of the inclined format is (x0, y0) and the inclined angle between the input format and the horizontal axis is "θ" as shown in FIG. 20(b). In this case, the coordinate value (x1, y1) of the input format located normally as shown in FIG. 20(c) is calculated by the following equations.

$$x1 = x0 \cos\theta + y0 \sin\theta$$

$$y1 = x0 \sin\theta + y0 \cos\theta$$

In short, the position of the input format to be located normally is adjusted by lotation to the position of the sample format (S64).

Figure 22A:
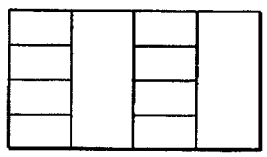
FIGS. 22(a)–22(f) are schematic diagrams of an example of similarity values between the input format and the plural sample formats.
Figure 22B:
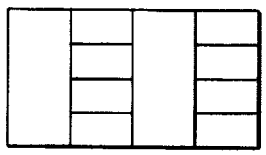
Figure 22B:
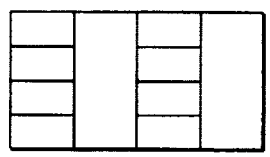
Figure 22C:
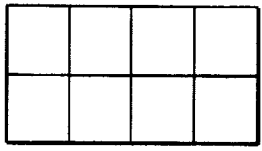
Figure 22C:
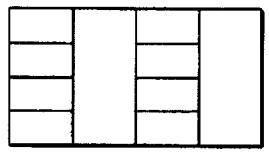
Figure 22D:
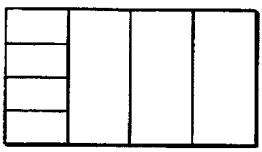
Figure 22D:
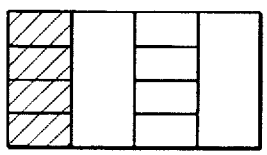
Figure 22E:
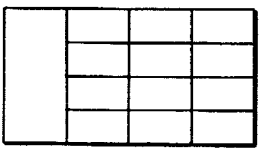
Figure 22E:
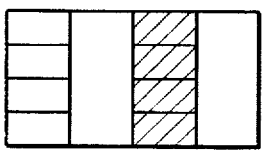
Figure 22F:
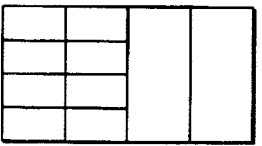
Figure 22F:
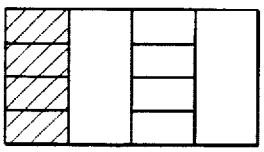

FIGS. 22(a)–22(f) are schematic diagrams of an example of similarity values between an input format and plural sample formats. FIGS. 23(a)–23(e) are schematic diagrams of an example of outputting the sample format according to the order of similarity. FIG. 22(a) shows the input format. FIGS. 22(b),(c),(d),(e) and (f) show the sample formats (left side), the input format with the portion thereof similar to the sample format highlighted by cross-hatching and the similarity value between the sample format and the input format (center and right side, respectively). Three modes for outputting the sample formats according to the similarity value can be used as follows.

(1) In a 1st mode, the sample format whose similarity is highest is outputted.

(2) In a 2nd mode, the sample formats whose similarity is above a threshold are outputted.

(3) In a 3rd mode, the sample formats are outputted in order according to similarity.

If the 1st mode is selected, then only the sample format (d) is outputted. If the 2nd mode is selected and the threshold is 50%, then only the sample format (d) is outputted. If the 3rd format is selected, then the sample formats are displayed in the following order as shown in FIG. 23:

$$(d) > (f) > (e) > (b) = (c)$$

If the user decides that all sample formats are not similar to the input format, the user confirms and corrects the plural frames of the input format on the display. Then, the plural forms of the input format is newly registered.

Figure 24:
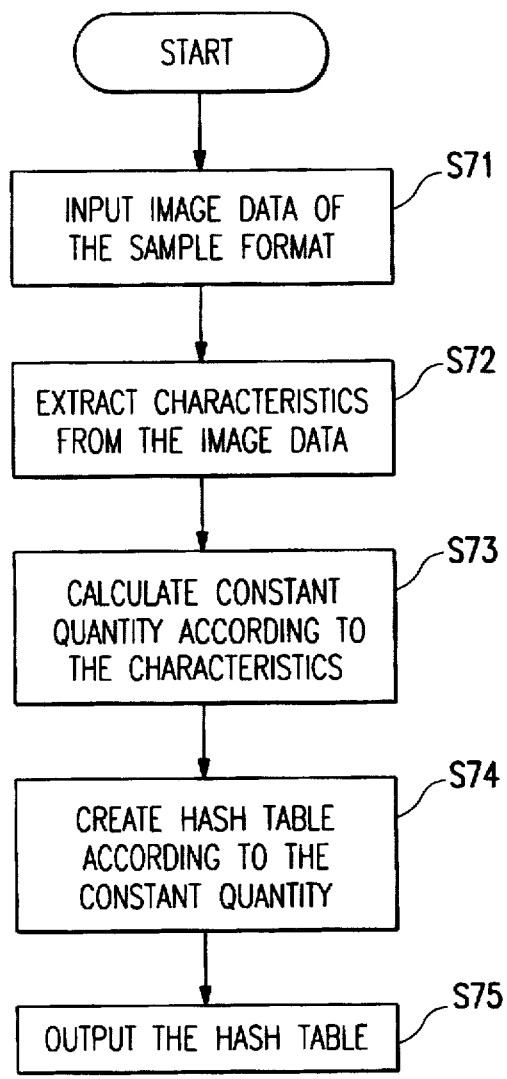
FIG. 24 is a flow chart of processing for creating a Hash table according to the present invention.
Figure 25:
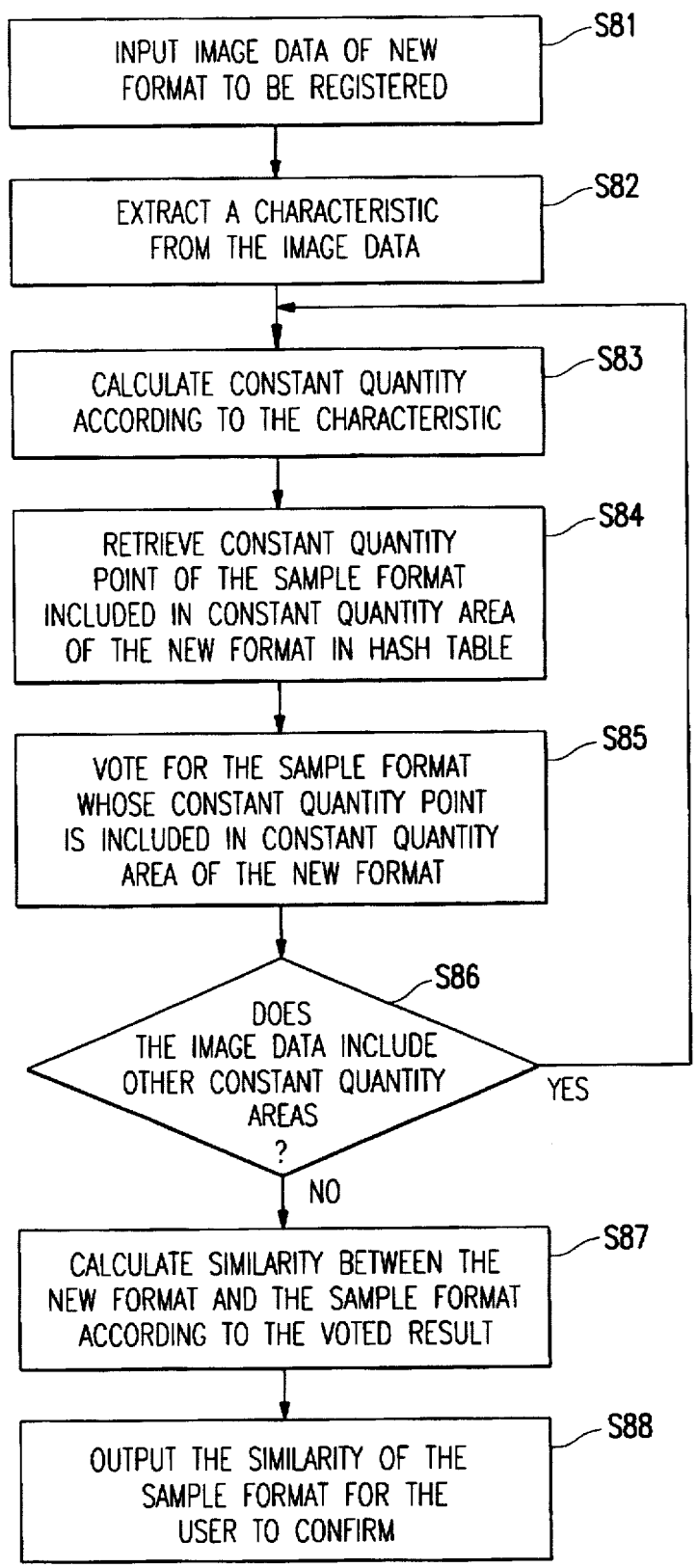
FIG. 25 is a flow chart of processing for deciding the sample format similar to the input format by using the Hash table according to the present invention.
Figure 26:
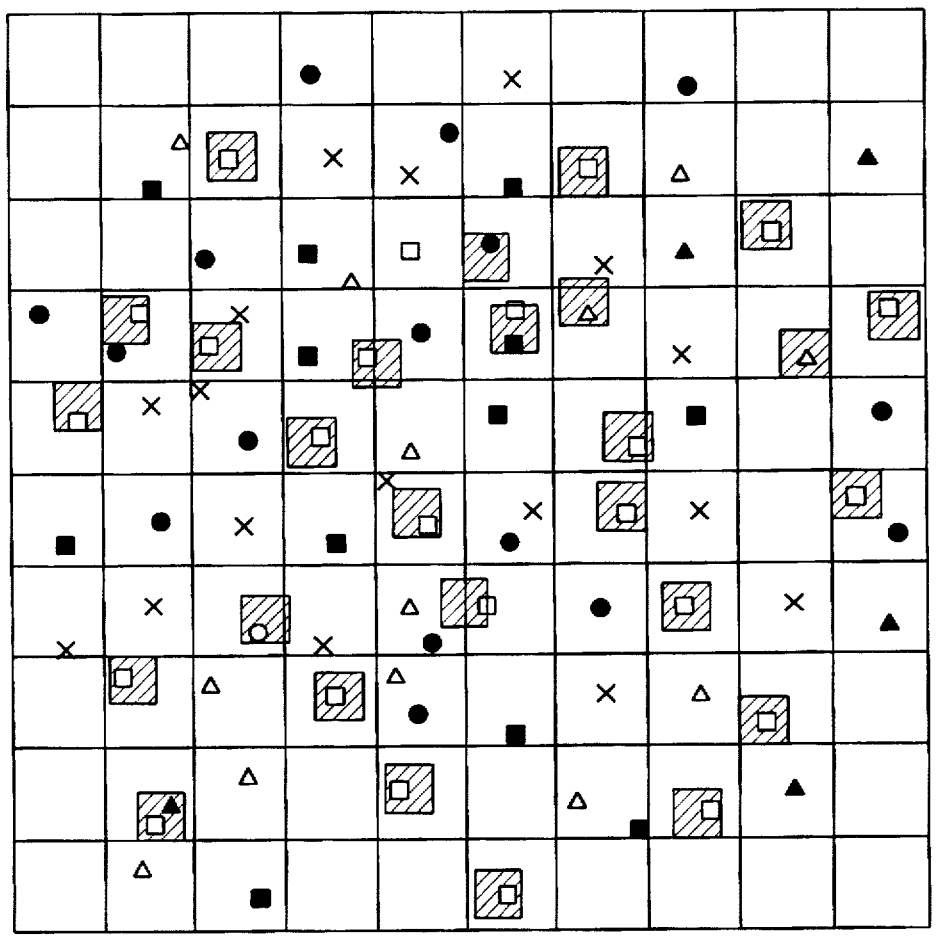
FIG. 26 is a schematic diagram of an example of the Hash table in which are written a constant quantity point of the sample form and a constant quantity area of the new form.

Next, another embodiment of the format discrimination mode of the present invention will be explained. In this case, the format discrimination is executed by using a Hash table as an image database. The processing includes preprocessing part of creating the Hash table and a decision processing part of deciding which sample format is similar to the input format according to the Hash table. FIG. 24 is a flow chart of the preprocessing part and FIG. 25 is a flow chart of the decision processing part. First, the image data of the plural sample formats are inputted in order (S71). Next, the characteristics, i.e., a center point of each frame and character lines, are extracted from the image data (S72). Then, a constant quantity is calculated according to the characteristics (S73). The constant quantity is defined as the center point of each frame of the sample format in the case that a circumscribed rectangle of the sample format is transformed to a square. The Hash table corresponds to the transformed square of the circumscribed rectangle of the sample format. In this case, the center point of each frame in the sample format of the square is plotted as the constant quantity point in the Hash table (S74). FIG. 26 is a schematic diagram of an example of the Hash table. In FIG. 26, there are seven kinds of constant quantity point "▲, ■, ●, χ, Δ, □, 0" which represent the center point of each frame of seven sample formats, respectively. In short, each characteristic of seven sample formats is written in the Hash table. In this way, the Hash table is outputted as a characteristic table of sample formats (S75).

Next, the decision processing part of this embodiment will be explained. First, image data of a new format is inputted (S81). The characteristics, i.e., center point of each frame and character lines, are extracted from the image data (S82). Then, a constant quantity is calculated according to the characteristics (S83). In the same way of the preprocessing part, the constant quantity is defined as the center point of each frame of the new format in the case that a circumscribed rectangle of the new format is transformed to a square. A predetermined area whose center point is the constant quantity point is written in the Hash table. The predetermined area is called a constant quantity area. Then, each constant quantity point of the sample format included in the constant quantity area of the new format in the Hash table is retrieved(S84). The vote value "1" is allocated for a sample format whenever its constant quantity point is found to be included in the constant quantity area of the new format (S85). In FIG. 26, the shaded square areas represent the constant quantity area of each frame of the new format. As shown in FIG. 26, the new format consists of twenty-seven frames. The vote processing is executed by unit of constant quantity area of the new format in the Hash table (S86). In the lower middle portion of FIG. 26, the vote result is shown by unit of the sample format. In this case, the sample format "6" has received the highest vote value. Thus, the similarity value between the new format and each sample format is calculated according to the respective vote results (S87). If the number of votes of the sample format is Nt and number of frames of the new format is K, the similarity value S is calculated as follows:

$$S = (Nt/K) * 100$$

FIG. 27 is a schematic diagram of an example of similarity values and numbers of votes for each sample form. In FIG. 27, the form 6 is most similar to the new format because the similarity value "85.1" is highest among those of the seven sample formats. In this way, the similarity value of the sample formats is outputted and the user confirms the form 6 to be used as the reference format of the new format (S88).

Next, plural modified embodiments of the image filing method will be explained. If the input form is decided to be the same as one of the registered forms but also including data filled into the form, the identifier of the registered form is stored with the input form. For example, in the case that the name of the registered form is "registration 001", the input form is stored with the identifier "registration 001, data 001". In this case, the kind of the registered form similar to the input form is descriminated by referring to the identifier.

If the kind of registered form similar to the input form is discriminated, the frames of the input form corresponding to each frame of the registered form are decided by referring to the Hash table. In this case, image data in the frame of the input form is detected and preserved as a partial image. For example, in the case that the name of the registered form is "registration 001" and the name of the input form is "registration 001, data 001", the partial image of the frame of the input form is preserved with the name "registration 001, data 001, frame 001. vas" in the image filing section.

Further, the partial image may be recognized as code data. For example, the code data may be stored with the name "registration 001, data 001, frame 001. code". In this case, it is established that the recognition result of the image data in the frame 001 of the input form 001 is preserved as code data.

Further, an attribute "address" can be added to the frame 001 of the registered format. In this case, particular data filled in the registered format as the input format is stored with the as name "registration 001, data χχχ". For example, if it is desired that the image data or the code data of the item "address" is outputted, it is retrieved by using the name "registration 001, data χχχ" frame 001.ras" or the name "registration 001, data χχχ" frame 001. code". In short, the user's desired data is effectively retrieved from the data file section.

Additional advantages and modifications will readily occur to those skilled in the art. The invention is its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. An image filing apparatus, comprising:

image input means for inputting image data of a new form, wherein said new form includes an input format which includes a plurality of input frames;

format registration means for previously registering a plurality of sample formats from a plurality of sample forms in a Hash table corresponding to a size of the sample format, wherein each of said plurality of sample formats includes a plurality of sample frames and wherein a center point of each said plurality of sample frames is written in the Hash table;

format discrimination means for extracting a center point of each of said plurality of input frames, for writing the center point of each of said plurality of input frames in the Hash table, for counting the number of center points of each of said plurality of input frames corresponding to said center points of each of said plurality of sample frames of each of said plurality of sample formats, and for selecting the sample format having the largest number of center points corresponding to said center points of said input format; and preservation means for storing the image data of the new form by using the selected sample format.

2. Image filing apparatus according to claim 1, wherein said format registration means includes means for extracting elements including lines, frames, and characters from forms, means for correcting the elements of the plurality of formats, and means for registering the plurality of formats as sample formats.

3. Image filing apparatus according to claim 1, wherein said format discrimination means includes means for extracting elements including lines, frames, and characters from the image data of the new form, and means for deciding which one of the plurality of formats is similar to the input format of the new form by using the extracted elements.

4. Image filing apparatus according to claim 1, wherein said format descrimination means includes means for merging neighboring frames to generate a circumscribed rectangle for the input format and the registered format, and for adjusting a position of the circumscribed frame of the input format to correspond to a position of a circumscribed rectangle of the registered format.

5. Image filing apparatus according to claim 4.

wherein said format discrimination means includes means for checking a correspondence between each frame of the circumscribed rectangle of the new format and each frame of the circumscribed rectangle of the registered format.

6. Image filing apparatus according to claim 4, wherein said format discrimination means includes means for rotating a position of the circumscribed rectangle of the input format to coincide with a position of the circumscribed rectangle of the registered format when the circumscribed rectangle of the input format is inclined with respect to the circumscribed rectangle of the registered format.

7. Image filing apparatus according to claim 5, wherein said calculating means calculates similarity between the input format and the registered format as a ratio of a number of frames of the registered format corresponding to the frames of the input format to a number of all frames of the registered format.

8. Image filing apparatus according to claim 7, wherein said format discrimination means includes means for selecting the registered format having a similarity larger than a threshold, and for displaying the registered format for a user to correct and confirm.

9. Image filing apparatus according to claim 7, wherein said format discrimination means includes means for selecting the registered format having the largest similarity among similarities of all registered formats, and for displaying the registered format for a user to correct and confirm.

10. Image filing apparatus according to claim 8, wherein said format discrimination means includes means for displaying the plurality of registered formats for the user to select one registered format when the similarities of all registered formats are not larger than the threshold.

11. Image filing apparatus according to claim 1, wherein said preservation means includes means for storing the input format of the new form in accordance with the image data, when no registered format is selected as similar to the input format from the plurality of formats in accordance with the similarity.

12. Image filing apparatus according to claim 1, wherein said preservation means includes means for storing the input format of the new form as one data structure including a specified area of the image data and coded information of the specified area of the image data, in accordance with the registered format selected.

13. Image filing apparatus according to claim 1, wherein said format registration means includes means for extracting a center point of each frame of the registered formats, respectively, means for calculating a constant quantity point corresponding to the center point of each frame in a Hash table having a square format, and means for writing the constant quantity point of each frame of the registered formats in the Hash table.

14. Image filing apparatus according to claim 13, wherein said format discrimination means includes means for extracting a center point of each frame of the input format, means for calculating a constant quantity point corresponding to the center point of each frame of the input format in the Hash table, and means for writing in the Hash table a constant quantity area of each frame of the input format.

15. Image filing apparatus according to claim 14, wherein said format discrimination means includes means for retrieving each constant quantity point of the registered format included in the constant quantity area of the input format in the Hash table, means for allocating a vote to the registered format whenever the constant quantity point thereof is included in the constant quantity area of the input format in the Hash table, and means for selecting the registered format having a largest vote among those of all registered formats as a similar format to the input format.

16. An image filing method comprising the steps of:

inputting image data of a new form, wherein said new form includes an input format which includes a plurality of input frames;

registering a plurality of sample formats from a plurality of sample forms in a Hash table corresponding to a size of the sample format, wherein each of said plurality of sample formats includes a plurality of sample frames and wherein a center point of each said plurality of sample frames is written in the Hash table;

extracting a center point of each of said plurality of input frames;

writing the center point of each of said plurality of input frames in the Hash table;

counting the number of center points of each of said plurality of input frames corresponding to the center points of each of said plurality of sample frames of each of said plurality of sample formats;

selecting the sample format having the largest number of center points corresponding to said center points of said input format; and storing the image data of the new form by using the selected sample format.

17. A computer-readable memory containing computer-readable instructions, comprising:

instruction means for causing a computer to register a plurality of sample formats from a plurality of sample forms in a Hash table corresponding to a size of the sample format, wherein each of said plurality of sample formats includes a plurality of sample frames and wherein a center point of each said plurality of sample frames is written in the Hash table;

instruction means for causing a computer to extract a center point of each of a plurality of input frames of an input format from image data of a newly inputted form;

instruction means for causing a computer to write the center point of each of said plurality of input frames in the Hash table;

instruction means for causing a computer to count the number of center points of each of said plurality of input frames corresponding to the center points of each of said plurality of sample frames of each of said plurality of sample formats;

instruction means for causing a computer to select the sample format having the largest number of center points corresponding to said center points of said input format; and instruction means for causing a computer to store the image data of the new form by using the selected sample format.

* * * * *